United States Patent
Defrain et al.

(10) Patent No.: US 10,633,513 B2
(45) Date of Patent: Apr. 28, 2020

(54) CURABLE LOW SULFUR LIQUID RUBBER COMPOSITIONS AND METHODS OF MANUFACTURING THE SAME

(71) Applicant: FINA TECHNOLOGY, INC., Houston, TX (US)

(72) Inventors: Olivier Defrain, Malling (FR); Olivier Klein, Freyming-Merlebach (FR); Philippe Lodefier, Wemmel (BE)

(73) Assignee: FINA TECHNOLOGY, INC., Houston, TX (US)

( * ) Notice: Subject to any disclaimer, the term of this patent is extended or adjusted under 35 U.S.C. 154(b) by 88 days.

(21) Appl. No.: 15/935,262

(22) Filed: Mar. 26, 2018

(65) Prior Publication Data

US 2019/0292351 A1   Sep. 26, 2019

(51) Int. Cl.
| | |
|---|---|
| *C08K 5/14* | (2006.01) |
| *C08J 3/24* | (2006.01) |
| *C08K 5/44* | (2006.01) |
| *C08K 3/06* | (2006.01) |
| *C08K 3/26* | (2006.01) |

(52) U.S. Cl.
CPC .................... *C08K 5/14* (2013.01); *C08J 3/24* (2013.01); *C08K 3/06* (2013.01); *C08K 3/26* (2013.01); *C08K 5/44* (2013.01); *C08L 2207/324* (2013.01)

(58) Field of Classification Search
CPC . C08K 5/14; C08J 3/24; C08J 2409/00; C08J 2409/10
See application file for complete search history.

(56) References Cited

U.S. PATENT DOCUMENTS

| | | | |
|---|---|---|---|
| 3,083,175 A | 3/1963 | Safford et al. | |
| 4,485,213 A * | 11/1984 | Matsuo | C08G 18/10 525/123 |
| 6,245,861 B1 | 6/2001 | Class | |
| 6,361,643 B2 | 3/2002 | Born et al. | |
| 8,137,500 B2 | 3/2012 | Sauer et al. | |
| 2004/0067380 A1 * | 4/2004 | Maeda | C08K 5/01 428/500 |

(Continued)

FOREIGN PATENT DOCUMENTS

| | | |
|---|---|---|
| CN | 106867628 A | 6/2017 |
| WO | 2015062054 A1 | 5/2015 |

(Continued)

OTHER PUBLICATIONS

Arkema Half-life website at http://www.arkema-inc.com/pdf/HalfLife.xls (Year: 2012).*

(Continued)

*Primary Examiner* — Mark S Kaucher
(74) *Attorney, Agent, or Firm* — Albert Shung

(57) ABSTRACT

A curable low sulfur liquid rubber composition including at least one polymer which contains, in polymerized form, at least one monomer having a carbon chain of four and a peroxide system comprising at least one organic peroxide having a 10-hour decomposition half-life temperature of from 60° C. to 100° C. The polymer has a vinyl content of 1% to 90% and a number average molecular weight of 800 g/mol to 15,000 g/mol. The curable low sulfur liquid rubber composition has a sulfur content of 0 to 1%, by weight, and is curable at a temperature of 100° C. to 140° C.

14 Claims, 6 Drawing Sheets

(56) References Cited

U.S. PATENT DOCUMENTS

2008/0293852 A1 11/2008 Gronowski et al.
2009/0087591 A1* 4/2009 Larson .................. C09J 4/06
428/1.5

FOREIGN PATENT DOCUMENTS

WO   2015089807 A1   6/2015
WO   2016094161 A1   6/2016

OTHER PUBLICATIONS

Ricon maleinized polybutadiene datasheet (Year: 2010).*
International Search Report and Written Opinion for International Application No. PCT/US2019/015147, dated May 8, 2019, 9 pages.
Dluzneski, P.R., "Peroxide Vulcanization of Elastomers," Rubber Chemistry and Technology, vol. 74 (2001), pp. 451-492.
Khoee, S., et al., "Microstructure Analysis of Brominated Styrene-Butadiene Rubber," 2007, pp. 87-94, Polymer Engineering and Science.
Sadeghi et al., "Determination of the Microstructure of Polybutadiene-ol Back-bone by FTIR and NMR Spectroscopy," 2003, vol. 12(6), pp. 515-521, Iranian Polymer Journal.
Okaya et al., "Vulcanization of Liquid Polybutadiene (III) Peroxide Vulcanization of Liquid Polybutadienes", Polymer Research & Development Laboratory Nisso Chemical Co., Ltd., vol. 48, No. 11, 1975, pp. 705-715 with partial translation.
Hergenrother, "Characterization of Networks from the Peroxide Cure of Polybutadiene. II. Kinetics and Sol-Gel", Journal of Polymer Science, Polymer Chemistry, vol. 11, 1973, pp. 1721-1732.

* cited by examiner

CURABLE LOW SULFUR LIQUID RUBBER COMPOSITIONS AND METHODS OF MANUFACTURING THE SAME

FIELD OF THE INVENTION

Aspects of the invention are directed to curable low sulfur liquid rubber compositions and, particularly to, low sulfur liquid rubber compositions that are curable with a peroxide system as well as methods of manufacturing the same.

BACKGROUND OF THE INVENTION

Liquid rubber compositions are commonly used as adhesives, sealants, and/or sound dampening materials in the automotive industry. Such compositions are referred to as "liquid rubber compositions" because they contain one or more polymers which are liquid at room temperature (25° C.) but which are capable of being cured by crosslinking reactions to provide solid elastomeric compositions. Depending on the intended purpose of the liquid rubber composition, various types of liquid rubber compositions may be used. The crosslinking agent for these compositions is generally sulfur or a sulfur compound. In body and paint shops, these liquid rubber compositions are typically cured at a temperatures ranging from 145° C. to 190° C. However, methods of curing liquid rubber compositions at temperatures of 145° C. to 190° C. result in adverse environmental impacts.

Accordingly, improved liquid rubber compositions that result in reduced adverse environmental impacts are greatly desired.

SUMMARY OF THE INVENTION

Aspects of the invention are directed to curable low sulfur liquid rubber compositions and, in particular, to low sulfur liquid rubber compositions that are curable with a peroxide system as well as methods of manufacturing the same. The inventors have discovered that it is possible to obtain effective curing of compositions based on one or more liquid polymers containing vinyl groups at relatively low temperatures (e.g., 100° C. to 140° C.), without the use of significant amounts of sulfur, if a peroxide system is employed which includes at least one organic peroxide having a 10-hour decomposition half-life temperature of from 60° C. to 100° C.

Various exemplary aspects of the invention may be summarized as follows:

Aspect 1: A curable low sulfur liquid rubber composition, the composition comprising:
 a polymer comprising, in polymerized form, at least one monomer having a carbon chain of four, the polymer having a vinyl content of 1% to 90% and a number average molecular weight of 800 g/mol to 15,000 g/mol;
 a peroxide system comprising at least one organic peroxide having a 10-hour decomposition half-life temperature from 60° C. to 100° C.; and
 wherein the composition has a sulfur content of 0 to 1% by weight and is curable at a temperature of 100° C. to 140° C.

Aspect 2: The composition of Aspect 1, wherein the polymer comprises butadiene in polymerized form.

Aspect 3: The composition of Aspect 1, wherein the polymer comprises butadiene and styrene in polymerized form.

Aspect 4: The composition of Aspect 1, wherein the polymer comprises at least one of liquid polybutadiene and liquid styrene-butadiene copolymer, the polymer having at least 10% 1,2-vinyl content.

Aspect 5: The composition of Aspect 1, wherein the at least one peroxide is selected from the group consisting of peroxyketals, diacyl peroxides and peroxyesters.

Aspect 6: The composition of Aspect 1, wherein the peroxide system comprises at least two organic peroxides.

Aspect 7: The composition of Aspect 6, wherein the at least two peroxides are selected from the group consisting of peroxyketals, diacyl peroxides and peroxyesters.

Aspect 8: The composition of Aspect 6, wherein the at least two peroxides are selected from the group consisting of 1,1'-di(tert-butylperoxy)-3,3,5-trimethylcyclohexane, 1,1'-di(tert-butylperoxy)-cyclohexane, and dibenzoyl peroxide.

Aspect 9: The composition of Aspect 1, further comprising 0.5% to 15%, by weight, of at least one coagent, other than sulfur or a sulfur compound, adapted for cross-linking.

Aspect 10: The composition of Aspect 9, wherein the at least one coagent is selected from the group consisting of acrylates, methacrylates, bismaleimides, vinyl esters, allylic compounds, and derivatives thereof.

Aspect 11: The composition of Aspect 1, wherein the composition is curable at a temperature from 110° C. to 140° C.

Aspect 12: The composition of Aspect 11, wherein the composition is curable at a temperature from 120° C. to 140° C.

Aspect 13: The composition of Aspect 1, further comprising an additive or a coagent adapted to accelerate the curing of the composition.

Aspect 14: The composition of Aspect 1, wherein the composition does not include mineral oils or aromatic oils.

Aspect 15: A cross-linked low sulfur rubber comprising the composition of Aspect 1 cured at a temperature from 100° C. to 140° C.

Aspect 16: The cross-linked low sulfur rubber of Aspect 15, wherein the cured cross-linked low sulfur rubber has a torsional shear difference that is at least 2.0 dNm greater than that of an analogous cross-linked sulfur rubber cured in the absence of the peroxide system with an amount of sulfur or sulfur compound effective to provide a sulfur content of more than 1% by weight.

Aspect 17: A method for producing a cured low sulfur rubber, the method comprising the step of:
 curing the curable low sulfur liquid rubber composition of Aspect 1 by heating, the curable low sulfur liquid rubber composition being curable at a temperature of 100° C. to 140° C. and having a sulfur content of 0 to 1% by weight.

Aspect 18: A method for making a cross-linked low sulfur rubber, the method comprising the steps of:
 polymerizing at least one monomer having a carbon chain of four to produce a polymer having a vinyl content of 1% to 90% and a number average molecular weight of 800 g/mol to 15,000 g/mol; and
 preparing a curable low sulfur liquid rubber composition based on the produced polymer and a peroxide system, the peroxide system comprising at least one organic peroxide having a 10-hour decomposition half-life temperature from 60° C. to 100° C., wherein the curable low sulfur liquid rubber composition is curable at a temperature of 100° C. to 140° C. and has a sulfur content of 0 to 1% by weight.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
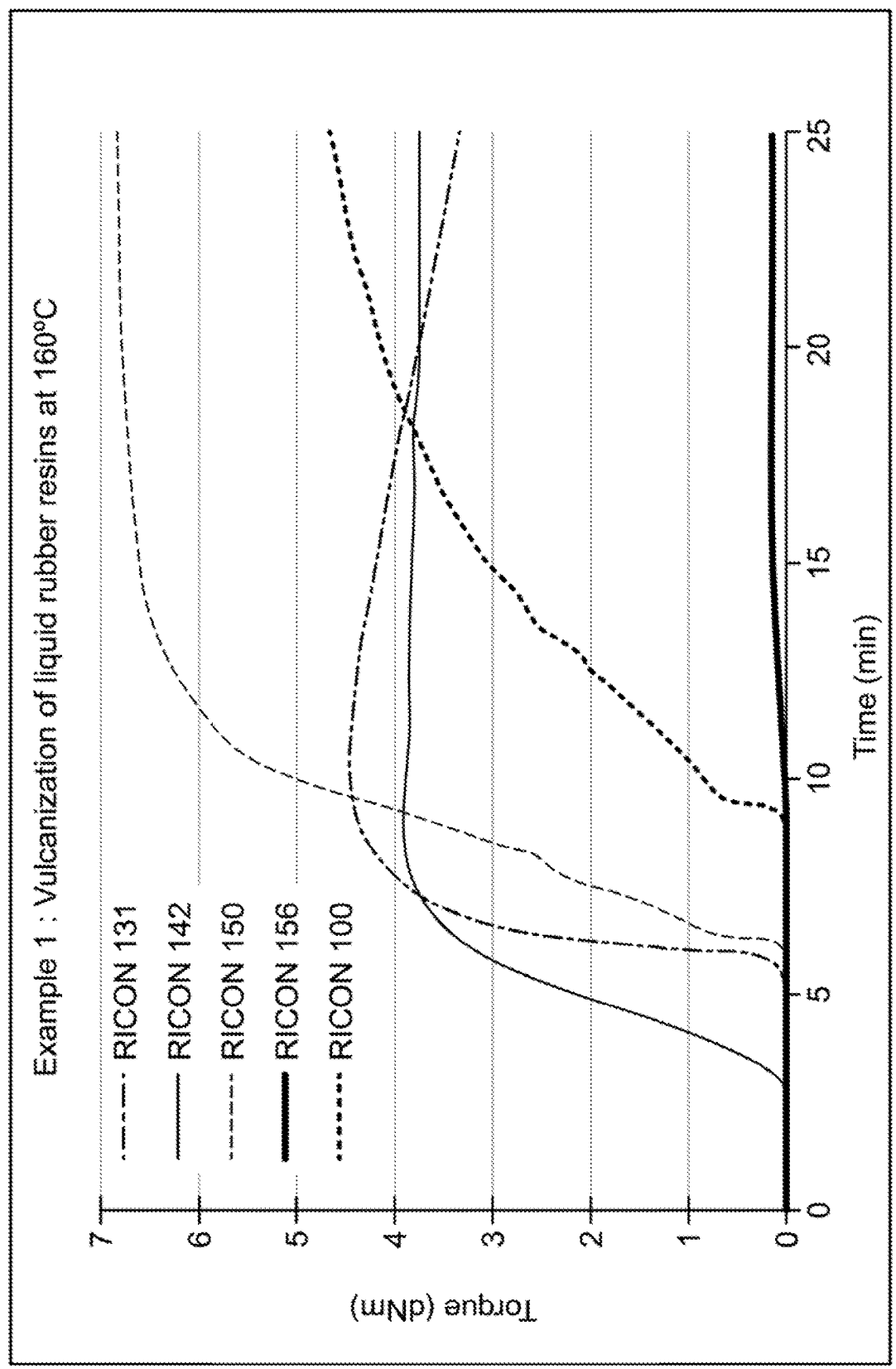
FIG. 1 is a graph depicting the kinetic curves of various rubber resins during vulcanization at 160° C.

Aspects of the invention are directed to low sulfur liquid rubber compositions that are curable with peroxide systems as well as methods of manufacturing the same. The curable low sulfur liquid rubber compositions may be well suited for use as adhesives, sealants, and/or acoustic dampening applications. By employing aspects of the invention, a curable low sulfur rubber composition may be obtained that is curable at a temperature of 100° C. to 150° C., which reduces and/or minimizes the adverse environmental effects associated with curing at typical temperatures of 150° C. to 190° C. Additionally, the curable low sulfur liquid rubber compositions may be cured with significantly reduced amounts of crosslinking agents and/or accelerators, and minimal sulfur content (e.g., the formulation contains less than 1.0% by weight sulfur).

According to one aspect of the invention, a curable low sulfur liquid rubber composition comprising at least one polymer and a peroxide system is provided. The polymer is formed of at least one monomer having a carbon chain of four. According to preferred embodiments, the polymer is liquid at 25° C. The polymer may comprise butadiene monomers, styrene monomers, and/or other diene monomers, in polymerized form. For example, the polymer may be a butadiene homopolymer (a polybutadiene) or may be a copolymer of butadiene and styrene monomers. The polymer may have a vinyl content of 1% to 90% or a vinyl content of, e.g., 5% to 85%, 10% to 80%, 15% to 75%, 20% to 70%, 25% to 65%, 30% to 60%, etc. In one embodiment, the polymer comprises at least one of liquid polybutadiene and liquid styrene-butadiene copolymer, where the polymer has at least 10% 1,2-vinyl content. Additionally, the polymer may have a number average molecular weight (as determined by gel permeation chromatography) of 800 g/mol to 15,000 g/mol. Preferably, the number average molecular weight of the polymer is 1000 g/mol to 10,000 g/mol. Combinations of two or more different polymers having one or more of the above-mentioned characteristics may be utilized in the curable low sulfur liquid rubber composition.

The curable low sulfur liquid rubber compositions include a peroxide system. By selecting certain peroxides or combinations of organic peroxides, It was discovered that cured rubber compositions may be obtained with a reduced amount of sulfur content (e.g., a sulfur content of 1% or less) and crosslinking agents, while advantageously having an increased crosslinking density. The peroxide system includes at least one organic peroxide having a 10-hour decomposition half-life temperature of from 60° C. to 100° C. Table 1 provides a list of exemplary organic peroxides, with the first three organic peroxides listed having a 10-hour half-life decomposition temperature suitable for use in the present invention.

"Half-life" is a convenient means of expressing the rate of decomposition of an organic peroxide at a specified temperature. The time required for one-half of the organic peroxide originally present to decompose at any particular temperature is measured. These time measurements can be performed at several temperatures. When the resulting data are plotted on log paper with half-life in hours versus temperature, a straight line is obtained. From this line one can interpolate the temperature at which half of a given organic peroxide decomposes in 10 hours. This is known as the 10-hour half-life decomposition temperature.

It is recognized in the art that the exact 10-hour decomposition half-life temperature of an organic peroxide may vary somewhat depending upon the test conditions used. For example, the solvent system and organic peroxide concentration used may have some relatively small effect on the 10-hour decomposition half-life temperature that is measured. As used herein, the 10-hour decomposition half-life temperature of an organic peroxide will be its 10-hour decomposition half-life temperature as reported in the following article: "Peroxide Vulcanization of Elastomers", P. R. Dluzneski, Rubber Chemistry and Technology, vol. 74 (2001), pp. 451-492. In the event the 10-hour decomposition half-life temperature for a particular organic peroxide is not listed in the aforementioned article, then its 10-hour decomposition half-life temperature will be the 10-hour half-life decomposition temperature measured using a 0.1 mol/L concentration of the organic peroxide in monochlorobenzene.

TABLE 1

| Organic Peroxide | Type of peroxide | CAS Number | 10-hr half Life Temperature (*) | 10-hr half Life Temperature (**) | Product from ARKEMA | Application |
|---|---|---|---|---|---|---|
| 1,1-Di-(tert-butylperoxy)-3,3,5-trimethylcyclohexane | Peroxyketal | 6731-36-8 | 92° C. | 94° C. | LUPEROX 231XL40 (powder with 40% of organic peroxide) | Crosslinking of natural and synthetic rubbers |
| Dibenzoyl Peroxide | Diacyl Peroxide | 94-36-0 | 73° C. | 71° C. | RETIC BP 50 (paste with 50% of organic peroxide) | Crosslinking unsaturated polyester and acrylic resins for several applications |

TABLE 1-continued

| Organic Peroxide | Type of peroxide | CAS Number | 10-hr half Life Temperature (*) | 10-hr half Life Temperature (**) | Product from ARKEMA | Application |
|---|---|---|---|---|---|---|
| 1,1-Di(t-butylperoxy)-cyclohexane | Peroxyketal | 3006-86-8 | 85° C. | 85° C. | LUPEROX 331M50 (liquid with 50% of organic peroxide) | Polymerization initiator for polymers based on styrene, ethylene, acrylics or methacrylics |
| 2,2-bis(tert-butylperoxy-isopropyl)benzene | Dialkyl Peroxide | 25155-25-3 | 117° C. | 117° C. | LUPEROX F40P (powder with 40% of organic peroxide) | Crosslinking of natural and synthetic rubbers |

(*) Data from "Peroxide Vulcanization of Elastomers", P. R. Dluzneski, Rubber Chemistry and Technology, vol. 74 (2001), pp. 451-492
(**) Data from brochures available on PERGAN Website (half-life times are determined using a solution of peroxides, at a concentration of 0.1 mol/L, in monochlorobenzene).

According to certain embodiments, the peroxide system present in the curable low sulfur liquid rubber composition consists of one or more organic peroxides having a 10-hour decomposition half-life temperature of from 60° C. to 100° C. (i.e., the curable low sulfur liquid rubber composition does not contain any organic peroxide other than one or more organic peroxides having a 10-hour decomposition half-life temperature of from 60° C. to 100° C.). In one embodiment, the peroxide system comprises at least one peroxide selected from the group consisting of peroxyketals (such as 1,1'-di(tert-butylperoxy)-3,3,5-trimethylcyclohexane or di(tert-butylperoxy)-cyclohexane), diacyl peroxides (such as dibenzoyl peroxide or dilauroyl peroxide) and peroxyesters (such as tert-butyl peroxyisobutyrate or tert-amyl peroxy-2-ethylhexylcarbonate). In another embodiment, the peroxide system consists of peroxides selected from the group consisting of peroxyketals (such as 1,1'-di(tert-butylperoxy)-3,3,5-trimethylcyclohexane or di(tert-butylperoxy)-cyclohexane), diacyl peroxides (such as dibenzoyl peroxide) and peroxyesters.

The peroxide system may include two or more organic peroxides. For example, the peroxide system may comprise at least two peroxides selected from the group consisting of peroxyketals (such as 1,1'-di(tert-butylperoxy)-3,3,5-trimethylcyclohexane or di(tert-butylperoxy)-cyclohexane), diacyl peroxides (such as dibenzoyl peroxide or dilauroyl peroxide) and peroxyesters (such as tert-butyl peroxyisobutyrate or tert-amyl peroxy-2-ethyihexylcarbonate). Preferably, the two or more peroxides of the peroxide system are selected from the group consisting of 1,1'-di(tert-butylperoxy)-3,3,5-trimethylcyclohexane, 1,1'-di(tert-butylperoxy)-cyclohexane, and dibenzoyl peroxide.

The amount of peroxide system present in the curable low sulfur liquid rubber composition will vary depending upon the type(s) of peroxide used, the reactivities of the polymer(s), the type and reactivity of the coagent (if present), and the desired curing profile and target cured rubber properties as well as other factors. Typically, however, the curable low sulfur liquid rubber composition will comprise a peroxide system in an amount of from 1 to 14 phr. As used herein, the term "phr" means parts by weight per 100 parts by weight resin, wherein the resin is the reactive polymer (eg., liquid polybutadiene polymer) or combination of reactive (crosslinkable) polymers present in the curable low sulfur liquid rubber composition.

The curable low sulfur liquid rubber compositions may include at least one coagent, other than sulfur or a sulfur compound, that is adapted for crosslinking. The coagent may contain one or more sites of ethylenic unsaturation (carbon-carbon double bonds) per molecule and may be selected from the group consisting of acrylates, methacrylates, bismaleimides, vinyl esters, allylic compounds, and derivatives thereof. In preferred embodiments of the invention, the curable low sulfur liquid rubber composition is comprised of from 0 phr to 30 phr coagent in total. In other embodiments, the curable low sulfur liquid rubber composition may be comprised of 0.5 to 15% by weight coagent. In one embodiment, however, suitable curing may be obtained without a substantial amount of coagent for accelerating the curing, e.g., less than 15% by weight, less than 10% by weight, less than 5% by weight, or less than 1% by weight of additives for accelerating the curing of the low sulfur liquid rubber compositions. Advantageously, the curable low sulfur liquid rubber compositions have a, sulfur content of 0 to 3%, by weight. Preferably, the sulfur content of the low sulfur liquid rubber composition is 0% to 0.9% by weight, more preferably 0 to 0.75% by weight, more preferably 0 to 0.6% by weight, or more preferably 0 to 0.5% by weight.

The curable low sulfur liquid rubber compositions are adapted to be curable at temperatures of 150° C. or less. For example, the curable low sulfur liquid rubber compositions may be heated to have an optimal crosslinking density to a temperature of 100° C. to 150° C. for 2 hours or less. For example, the curable low sulfur liquid rubber compositions may be heated to have an optimal crosslinking density for two hours or less in a temperature range of 100° C. to 140° C., e.g., 105° C. to 135° C., 110° C. to 130° C., or 115° C. to 125° C. Additionally or alternatively, the curable low sulfur liquid rubber compositions may be cured to the extent that the torsional shear difference for the cured rubber composition is 6 dNm or more (e.g., measured as a change in torque of 6 dNm or more) by heating the liquid rubber composition to a temperature of 100° C. to 150° C. for 2 hours or less. For example, the curable low sulfur liquid rubber compositions may be cured to have a torsional shear force difference of 6 dNm or more by heating the liquid rubber composition, for two hours or less, in a temperature range of 100° C. to 140° C., 105° C. to 135° C., 110° C. to 130° C., or 115° C. to 125° C. In one embodiment, the curable low sulfur liquid rubber compositions may be cured to have a torsional shear force difference of 8 dNm or more by heating the liquid rubber composition, for two hours or less, at a temperature in the above ranges. In another embodiment, the curable low sulfur liquid rubber compositions may be cured to have a torsional shear force difference of 12 dNm or more by heating the liquid rubber composition, for two hours or less, at a temperature in the above ranges.

The crosslinking level achieved in formulations based on at least one liquid rubber resin may be estimated by using a rotorless torsional shear rheometer, in accordance with the known state of the art. Such a device measures the force generated by the deformation resistance of a specimen during its crosslinking reaction. This force is measured as torque (Unit: dNm). The torque difference calculated from the data provided by a rotorless torsional shear rheometer can be roughly proportional to the crosslink density of liquid rubber compositions.

According to another aspect of the invention, a method is provided for making a curable low sulfur liquid rubber composition. The method may include polymerizing at least one monomer having a carbon chain of four to produce a polymer having a vinyl content of 1% to 90% and a number average molecular weight of 800 g/mol to 15,000 g/mol. Alternatively, a suitable polymer may be obtained commercially from companies such as Total Cray Valley™.

The method further includes preparing the curable low sulfur liquid composition by combining the produced/obtained polymer and a peroxide system. The peroxide system includes at least one organic peroxide having a 10-hour decomposition half-life temperature in the range of from 60° C. to 100° C., as discussed above. Desirably, the curable low sulfur liquid rubber composition is curable at a temperature of 100° C. to 140° C. and has a sulfur content of 0 to 1% by weight. Additives and coagents may be incorporated into the curable low sulfur liquid composition as discussed herein using processing steps known to one of skill in the art.

According to a further aspect of the invention, provided is a cured low sulfur rubber. The cured low sulfur rubber may be obtained by curing a curable low sulfur liquid rubber compositions disclosed herein by heating the curable low sulfur liquid rubber composition. The curable low sulfur liquid rubber composition are, advantageously, curable at a temperature of 100° C. to 140° C. and have a sulfur content of 0 to 1% by weight. As a result of such curing, the curable low sulfur liquid rubber composition is converted (e.g., by crosslinking reactions) into a solid, elastomeric (rubbery) composition. Typically, curing is achieved by heating the curable low sulfur liquid rubber composition to a temperature effective to initiate the desired crosslinking reaction involving at least the polymer component.

Optionally, one or more additional components may be included in the curable low sulfur liquid rubber composition in order to achieve the final properties necessary or desired for particular end-use applications (such as adhesive and sealant applications). A non-exhaustive list of such optional additional components is as follows:
  one or more solid rubbers or elastomers;
  fillers, preferably fillers heat treated or treated with silanes, resins, or cationic species to prevent/reduce decomposition of some peroxides;
  tackifiers and/or coupling agents;
  adhesion promoters, such as functionalized liquid rubber resins (e.g., maleinized liquid polybutadiene resins);
  plasticizers or extender oils, such as paraffinic oil; and/or
  stabilizers against thermal, thermo-oxidative or ozone degradation.

According to certain embodiments of the invention, the curable low sulfur liquid rubber composition includes at least one filler, in particular at least one inorganic filler. Suitable fillers include any of the fillers known in the art related to curable liquid rubber compositions, including for example calcium carbonate, silicas, carbon black, clays, talc, mica, calcium oxide, aluminas, magnesium carbonate, and the like. The aforementioned fillers may be be heat treated or treated with silanes, resins, or cationic species to prevent or reduce decomposition of some peroxides. The curable low sulfur liquid rubber composition may, for example, be comprised of up to 75 phr filler.

The cured cross-linked low sulfur rubber preferably has a torsional shear force that is at least 2.0 dNm greater than that of an analogous cross-linked sulfur rubber cured in the absence of the peroxide system with an amount of sulfur or sulfur compound effective to provide a sulfur content of more than 1% by weight. In one embodiment, the cured cross-linked low sulfur rubber preferably has a torque difference that is at least 6.0 dNm greater than that of an analogous cross-linked sulfur rubber cured in the absence of the peroxide system with an amount of sulfur or sulfur compound effective to provide a sulfur content of more than 1% by weight. In another embodiment, the cured cross-linked low sulfur rubber preferably has a torque difference that is at least 8.0 dNm greater than that of an analogous cross-linked sulfur rubber cured in the absence of the peroxide system with an amount of sulfur or sulfur compound effective to provide a sulfur content of more than 1% by weight. In yet a further embodiment, the cured cross-linked low sulfur rubber preferably has a torque difference that is at least 12.0 dNm greater than that of an analogous cross-linked sulfur rubber cured in the absence of the peroxide system with an amount of sulfur or sulfur compound effective to provide a sulfur content of more than 1% by weight.

The curable low sulfur liquid rubber compositions of the present invention are especially useful for the production of materials intended for the reduction of vibration and/or acoustic noise, such as in automotive and other vehicular applications. The curable low sulfur liquid rubber compositions in the cured state have acoustic damping properties. Any of the known or conventional coating, molding, shaping, forming or impregnation methods known in the art may be employed to produce articles comprised of a cured rubber obtained from the curable low sulfur liquid rubber compositions of the present invention. For example, the inventive curable low sulfur liquid rubber compositions may be utilized in the manufacture of acoustic dampening components, belts, hoses, rubber rollers, engineered products, vibration mounts, tires, and the like, including elastomeric products or composite products containing an elastomeric component generally. The use of the curable low sulfur liquid rubber compositions of the present invention as adhesives, sealants and coatings is also contemplated. In one embodiment, the curable low sulfur liquid rubber composition is applied to a substrate surface (such as a metal sheet, panel or other such component), using a suitable technique such as spraying, dipping, roller coating or the like, and then heated to a temperature to cure the curable low sulfur liquid rubber composition. Accordingly, the curable low sulfur liquid rubber composition may be formulated such that it has a viscosity which makes it capable of being applied by spraying. For example, the curable low sulfur liquid rubber composition may be sprayable with the aid of automatic application systems, such as robotic systems.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable liquid rubber composition, process using the curable low sulfur liquid rubber composition, or article made using the curable low sulfur liquid rubber composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The following non-limiting examples are provided for the purpose of elucidating the advantages obtained from aspects of the present invention.

Example 1

Liquid rubber compositions may be vulcanized using vulcanization systems comprising sulfur or sulfur-containing compounds, which act as a crosslinking agent (e.g., in an amount higher than 4% of total weight of the composition); accelerators and/or ultra-accelerators, which optimize crosslinking density and curing (e.g., in an amount from 1.0% to 7.0% of total weight of the formulation); and activator systems (e.g., ZnO/Stearic Acid compounds). The total amount of sulfur and accelerators in liquid rubber composition is generally higher than 5% by weight. Table 2, shown below, provides typical formulations for vulcanizing liquid rubber compositions. TBBS is N-tert-butyl-2-benzothiazyl-sulfenamide. TMTD is tetramethylthiuram disulfide.

TABLE 2

MODEL FORMULATION

| Components | Quantity (wt %) |
|---|---|
| Liquid Rubber Resin | 57.3 |
| Calcium Carbonate | 28.6 |
| Sulfur | 5.7 |
| TBBS (Accelerator) | 4.5 |
| TMTD (Ultra-accelerator) | 0.5 |
| Zinc Stearate | 3.4 |
| Total | 100.0 |

Table 3, below, lists various RICON® polymers, which are low molecular weight homopolymers of butadiene and copolymers of butadiene and styrene monomers, produced by Total Cray Valley™.

TABLE 3

LIQUID RUBBER RESINS COMMERCIALIZED BY TOTAL CRAY VALLEY

| Ricon ® Grade | Type | But/Sty (%) | Mn (g/mol) | Vinyl % | Tg (° C.) |
|---|---|---|---|---|---|
| Ricon ® 100 | Styrene-butadiene Copolymer | 75/25 | 4500 | 70 | −22 |
| Ricon ® 131 | Liquid Polybutadiene | 100/0 | 4500 | 28 | −82 |
| Ricon ® 142 | Liquid Polybutadiene | 100/0 | 3900 | 55 | −74 |
| Ricon ® 150 | Liquid Polybutadiene | 100/0 | 3900 | 70 | −38 |
| Ricon ® 156 | Liquid Polybutadiene | 100/0 | 1400 | 70 | −55 |

Figure 2:
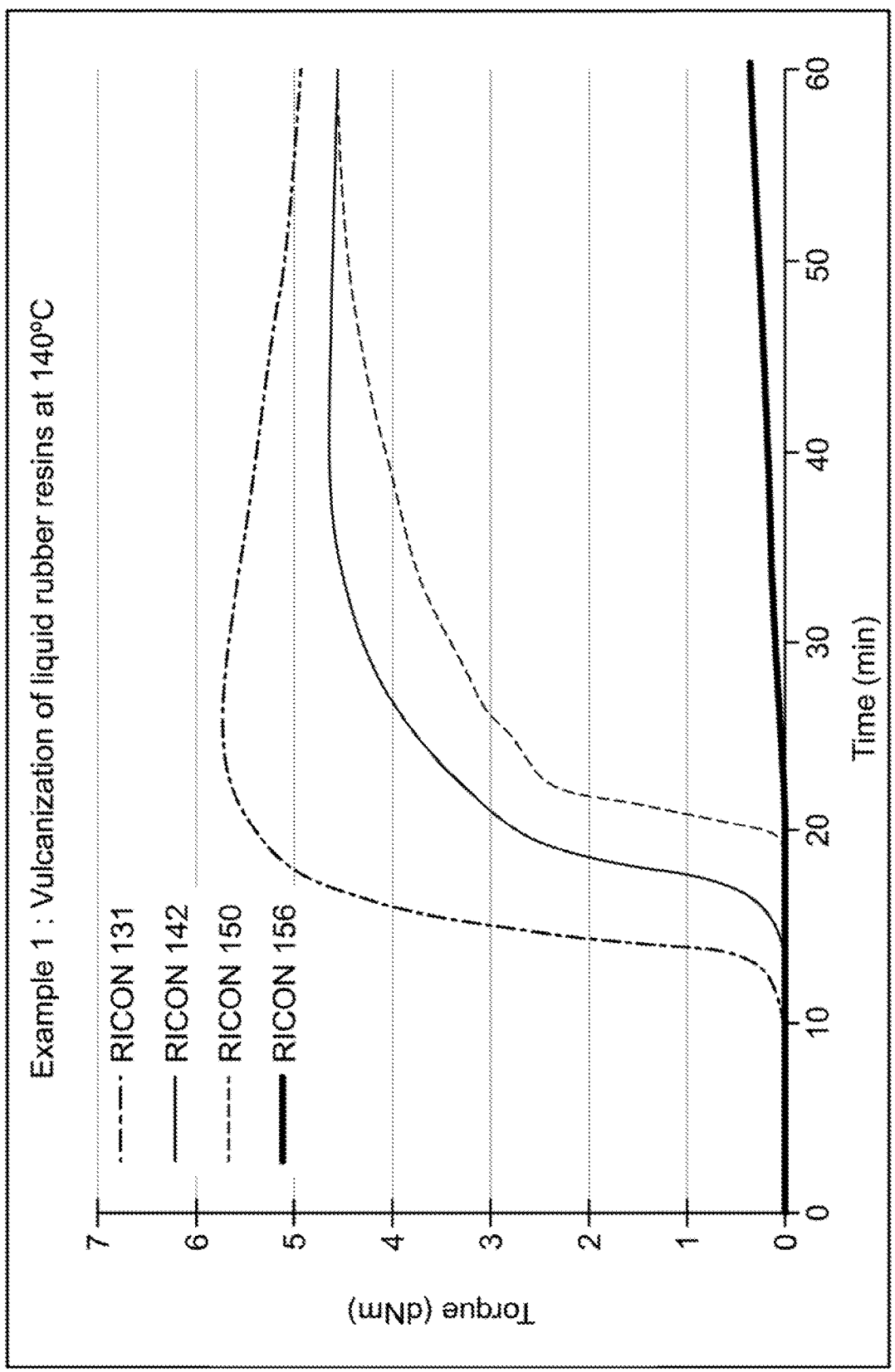
FIG. 2 is a graph depicting the kinetic curves of various rubber resins during vulcanization at 140° C.

Dynamic Mechanical Rheological Testing equipment, such as Premier™ RPA from Alphatechnologies, was used to determine the vulcanization kinetics and to estimate the crosslinking densities of the liquid rubber compositions at two different temperatures (see FIGS. 1 and 2). Such a rheometer measures the force generated by the deformation resistance of a specimen during its crosslinking reaction. This force is measured as torque (Unit: dNm). The torque difference calculated from the data provided by a rotorless torsional shear rheometer can be roughly proportional to the crosslink density of liquid rubber compositions.

By using a large amount of sulfur and accelerators (e.g., more than 10%, by weight, of sulfur and accelerators), the liquid styrene-butadiene copolymers and liquid polybutadienes could be cross-linked at temperature from 140° C. to 160° C. However, the crosslinking densities of all the cured rubber compositions remained low (as reflected, for example, by a torque value of less than 8 dNm) for this curing temperature range.

Example 2

The crosslinking density of several RICON® polymers using peroxide systems comprised of organic peroxides was assessed using the Premier™ RPA apparatus mentioned above. Curable low sulfur liquid rubber compositions comprising RICON® 131 polymers were cured with the peroxide systems listed in Table 4. The crosslinking density, as determined by the torsional shear force, of the low sulfur liquid rubber compositions was assessed and illustrated as a graph in FIG. 3.

TABLE 4

| Components | R131 Vulc | R131-1P-130° C. | R131-2P-130° C. | R131-2P-120° C. |
|---|---|---|---|---|
| Ricon ® 131 | 57.3 | 62.3 | 62.3 | 62.0 |
| Calcium Carbonate | 28.6 | 33.5 | 33.5 | 32.7 |
| Zinc Stearate | 3.4 | | | |
| Sulfur | 5.7 | | | |
| Accelerators | 5.0 | | | |
| Di(t-butylperoxy)trimethylcyclohexane | | 4.2 | 2.2 | |
| Di(t-butylperoxy)cyclohexane | | | 2.0 | 2.7 |
| Benzoyl Peroxide | | | | 2.6 |
| TOTAL | 100.0 | 100.0 | 100.0 | 100.0 |
| ΔTorque Max (dNm) | 5.7 | 12.9 | 20.3 | 8.1 |

Figure 3:
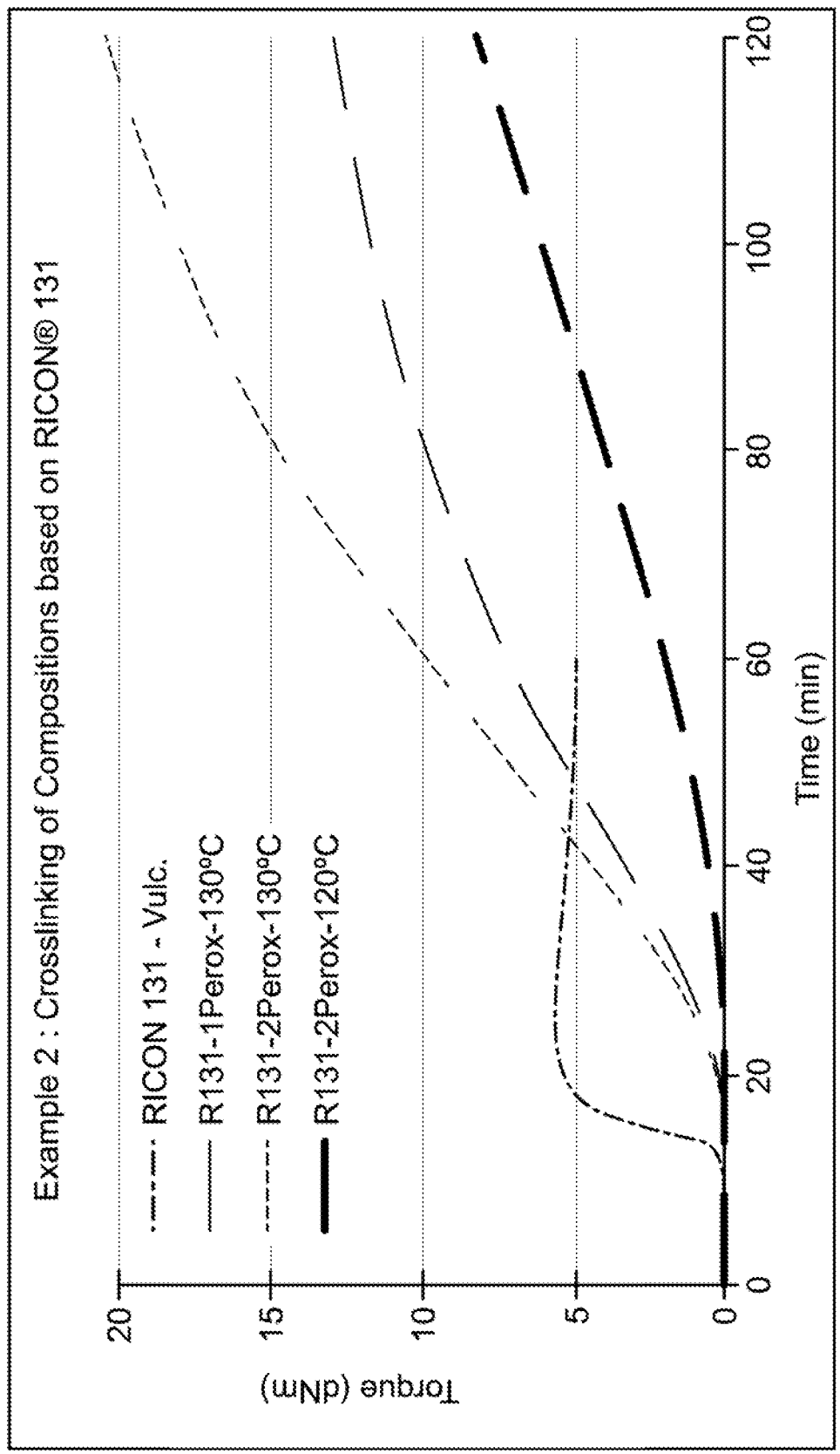
FIG. 3 is a graph depicting the kinetic curves of liquid rubber compositions comprising Ricon® 131 based on curing with a vulcanization system or various peroxide systems in accordance with aspects of the invention.

The 1,2-group vinyl content of the RICON® 131 polymer was less than 35%. As illustrated in FIG. 3, the low sulfur liquid rubber compositions comprising RICON® 131 were not highly reactive with standard organic peroxides polymers. However, it was determined that the three peroxide systems provided higher crosslinking densities than the vulcanization system containing sulfur. Moreover, the amount of crosslinking agent used to cure the liquid rubber compositions comprising RICON® 131 with peroxide systems was significantly reduced, e.g., by about 26%, and no accelerator was necessary to achieve the high crosslinking amount. The peroxide systems comprising two organic peroxides were very efficient at curing the low sulfur liquid rubber compositions comprising RICON® 131 at temperatures of 140° C. or less. Additionally, the peroxide systems using two organic peroxides produced the highest amount of crosslinking.

Example 3

Liquid rubber compositions comprising RICON® 156 polymers were cured using either a peroxide system or a vulcanization system to determine if a peroxide system could be used to cure the liquid rubber compositions at a temperature of 130° C. Table 5, shown below, provides the details of the liquid rubber compositions tested in this Example.

TABLE 5

| Components | R156 Vulc | R156-2P-130° C. |
|---|---|---|
| Ricon ® 156 | 57.3 | 62.3 |
| Calcium Carbonate | 28.6 | 33.5 |
| Zinc Stearate | 3.4 | |

TABLE 5-continued

| Components | R156 Vulc | R156-2P-130° C. |
|---|---|---|
| Sulfur | 5.7 | |
| Accelerators | 5.0 | |
| Di(t-butylperoxy)trimethylcyclohexane | | 2.2 |
| Di(t-butylperoxy)cyclohexane | | 2.0 |
| Benzoyl Peroxide | | |
| TOTAL | 100.0 | 100.0 |
| ΔTorque Max (dNm) | 0.4 | 6.7 |

Figure 4:
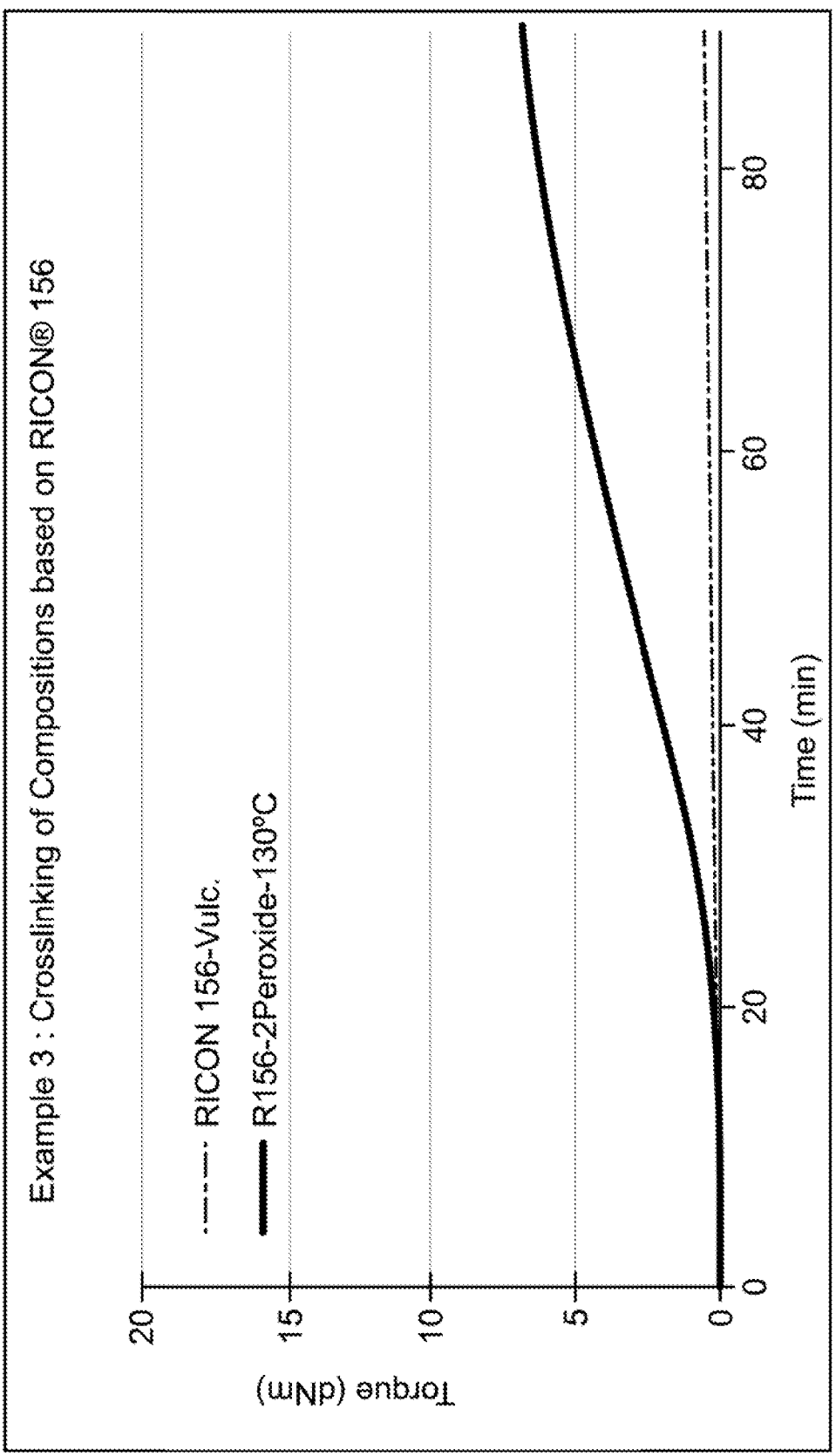
FIG. 4 is a graph depicting the kinetic curves of liquid rubber compositions comprising Ricon® 156 based on curing with a vulcanization system or a peroxide system according to aspects of the invention.

As illustrated in FIG. 4, the crosslink density of the rubber composition cured with a sulfur based vulcanization system at a temperature of 140° C. was much lower than the crosslink density of the low sulfur rubber composition cured with the peroxide system at a temperature of 130° C. Additionally, the quantity of product participating during the curing of the low sulfur rubber composition with the peroxide system was significantly reduced (e.g., by more than 50%) as compared to the amount of product participating during the curing of the rubber composition using the sulfur based vulcanization system.

Example 4

Figure 5:
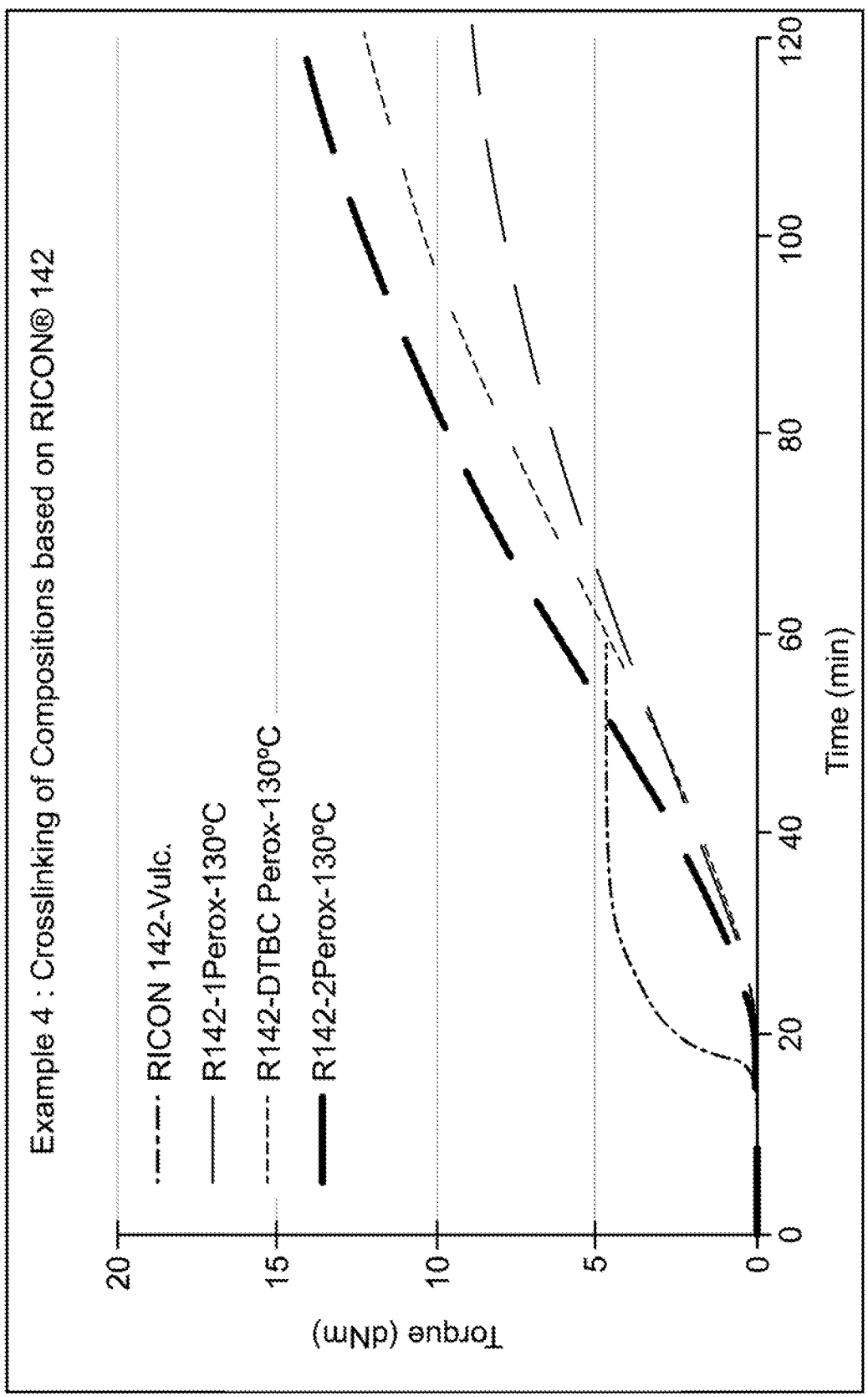
FIG. 5 is a graph depicting the kinetic curves of liquid rubber compositions comprising Ricon® 142 based on curing with a vulcanization system or various peroxide systems in accordance with aspects of the invention.

Liquid rubber compositions comprising RICON® 142 polymer were cured using peroxide systems or a vulcanization system to assess the crosslinking density produced by the curing of liquid rubber compositions having a high vinyl content. RICON® 142 polymer has a vinyl content of about 55%. The liquid rubber compositions comprising RICON® 142 are provided in Table 6. FIG. 5 illustrates a graph comparing the crosslinking densities of the rubber compositions comprising RICON® 142 polymer during curing (as indicated by the torque differences measured).

TABLE 6

| Components | RICON 142-Vulc. | R142-1Perox-130° C. | R142-DTBC Perox-130° C. | R142-2Perox-130° C. |
|---|---|---|---|---|
| RICON ® 142 | 57.3 | 64.2 | 64.0 | 64.0 |
| Calcium Carbonate | 28.6 | 33.0 | 33.2 | 33.0 |
| Zinc Stearate | 3.4 | | | |
| Sulfur | 5.7 | | | |
| Accelerators | 5.0 | | | |

TABLE 6-continued

| Components | RICON 142-Vulc. | R142-1Perox-130° C. | R142-DTBC Perox-130° C. | R142-2Perox-130° C. |
|---|---|---|---|---|
| Di(tert-butylperoxy)-trimethylcyclohexane | | 2.8 | | 1.3 |
| Di(t-butylperoxy)cyclohexane | | | 2.8 | 1.7 |
| Benzoyl Peroxide | | | | |
| Total | 100.0 | 100.0 | 100.0 | 100.0 |
| Δ Torque Max (dNm) | 4.7 | 8.9 | 12.1 | 14.3 |

It was determined that curing the liquid rubber compositions comprising RICON® 142, which has a vinyl content of about 55%, with a peroxide system produces a cured rubber composition having a crosslinking density that is significantly greater than the rubber composition that was cured with a standard sulfur based vulcanization system. By combining 1,1-di(t-butylperoxy)-cyclohexane with di(t-butylperoxy)-cyclohexane, the crosslinking density of the cured rubber composition was increased by a multiple of 3 (in comparison with the standard vulcanization system), while the amount of chemical components used for curing was reduced by a multiple of more than 3.5.

Example 5

Figure 6:
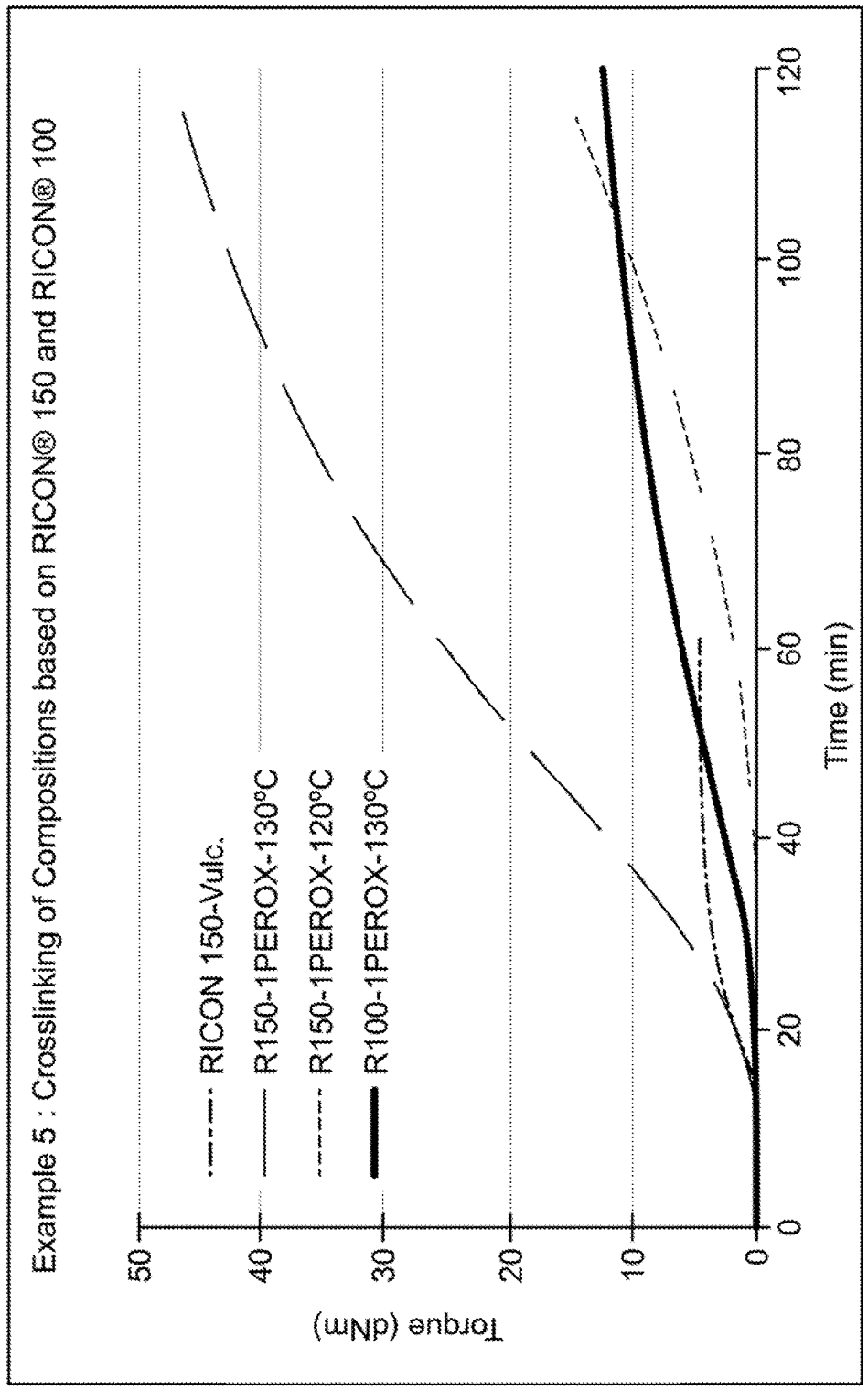
FIG. 6 is a graph depicting the kinetic curves of liquid rubber compositions comprising Ricon® 150 or Ricon® 100 based on curing with a vulcanization system or various peroxide systems according to aspects of the invention.

Liquid rubber compositions comprising RICON® 150 or RICON® 100 polymer were cured using peroxide systems or a sulfur based vulcanization system to assess the crosslinking density produced by the peroxide system as compared to the sulfur based vulcanization system. The formulations of liquid rubber compositions are provided in Table 7 and a graph comparing the crosslinking densities of the liquid rubber compositions during curing is provided in FIG. 6.

TABLE 7

| Components | R150 Vulc | R150-1P-130° C. | R150-1P-120° C. | R100-1P-130° C. |
|---|---|---|---|---|
| Ricon ® 150 | 57.3 | 64.2 | 64.2 | |
| Ricon ® 100 | | | | 64.2 |
| Calcium Carbonate | 28.6 | 33.0 | 33.0 | 33.0 |
| Zinc Stearate | 3.4 | | | |
| Sulfur | 5.7 | | | |
| Accelerators | 5.0 | | | |
| Di(t-butylperoxy)trimethylcyclohexane | | 2.8 | 2.8 | 2.8 |
| Di(t-butylperoxy)cyclohexane | | | | |
| Benzoyl Peroxide | | | | |
| TOTAL | 100.0 | 100.0 | 100.0 | 100.0 |
| ΔTorque Max (dNm) | 4.5 | 47.1 | 14.6 | 12.3 |

Advantageously, it was observed that a cured low sulfur rubber composition could be obtained having a high crosslinking density and a significantly reduced amount of crosslinking agents (about 70% less crosslinking agent compared to the analogous rubber composition cured using the sulfur based vulcanization system) by using a peroxide system and a liquid polybutadiene having a high vinyl content (e.g., RICON® 150) or a styrene-butadiene copolymer having a high vinyl content (e.g., RICON® 100). These results were observed for curing temperatures of 120° C. and 130° C.

Example 6

Additional work on curable compositions based on liquid rubber resins and peroxide systems was done in order to further improve their curing kinetics (in comparison with a sulfur vulcanization system). The following describes examples of compositions based on liquid rubber resins and cured at 140° C. (with both types of crosslinking systems):

Liquid rubber compositions were cured at 140° C. with a peroxide system or a sulfur-based vulcanization system to compare the effects of curing with a preferred peroxide system. Table 8 provides the formula of the liquid rubber compositions.

TABLE 8

| Components | Formulation - sulfur vulcanization system | Formulation - peroxide blend system |
|---|---|---|
| Liquid PB resin - 28% vinyl | 51.0 g | 55.9 g |
| Calcium Carbonate | 32.8 g | 36.5 g |
| Sulfur | 6.2 g | |
| TBBS | 4.7 g | |
| Ultra-accelerator | 1.5 g | |
| Zinc Stearate | 3.8 g | |
| 1,1'-di(tert-butylperoxy)-3,3,5-trimethylcyclohexane | | 3.8 |
| 1,1'-di(tert-butylperoxy)-cyclohexane | | 3.8 |
| Total | 100 g | 100 g |
| % crosslinking agent | 12.4% | 7.6% |
| Scorch time - 140° C. | 16.0 min | 4.0 min |

TABLE 8-continued

| Components | Formulation - sulfur vulcanization system | Formulation - peroxide blend system |
|---|---|---|
| Curing time - ts90 - 140° C. | 22.0 min | 24.4 min |
| Shore A | 66 | 65 |

The low sulfur rubber composition cured with the peroxide system had a hardness and a curing time that was about equivalent to the hardness and curing time of the rubber composition cured with the sulfur based vulcanization system. However, the low sulfur rubber composition cured with the peroxide system advantageously contained about 38% less crosslinking agents than the rubber composition cured with the sulfur-based vulcanization system.

What is claimed is:

1. A curable low sulfur liquid rubber composition, the composition comprising:
    a polymer comprising, in polymerized form, at least one monomer having a carbon chain of four, the polymer having a vinyl content of 1% to 90% and a number average molecular weight of 800 g/mol to 15,000 g/mol;
    a peroxide system comprising at least two organic peroxides having a 10-hour decomposition half-life temperature from 60° C. to 100° C. selected from the group consisting of 1,1'-di(tert-butylperoxy)-3,3,5-methylcyclohexane, 1,1'-di(tert-butylperoxy)-cyclohexane, and dibenzoyl peroxide; and
    wherein the composition has a sulfur content of 0 to 1% by weight and is curable at a temperature of 100° C. to 140° C.

2. The composition of claim 1, wherein the polymer comprises butadiene in polymerized form.

3. The composition of claim 1, wherein the polymer comprises butadiene and styrene in polymerized form.

4. The composition of claim 1, wherein the polymer comprises at least one of liquid polybutadiene and liquid styrene-butadiene copolymer, the polymer having at least 10% 1,2-vinyl content.

5. The composition of claim 1, further comprising 0.5% to 15%, by weight, of at least one coagent, other than sulfur or a sulfur compound, adapted for cross-linking.

6. The composition of claim 5, wherein the at least one coagent is selected from the group consisting of acrylates, methacrylates, bismaleimides, vinyl esters, allylic compounds, and derivatives thereof.

7. The composition of claim 1, wherein the composition is curable at a temperature from 110° C. to 140° C.

8. The composition of claim 7, wherein the composition is curable at a temperature from 120° C. to 140° C.

9. The composition of claim 1, further comprising an additive or a coagent adapted to accelerate the curing of the composition.

10. The composition of claim 1, wherein the composition does not include mineral oils or aromatic oils.

11. A cross-linked low sulfur rubber comprising the composition of claim 1 cured at a temperature from 100° C. to 140° C.

12. The cross-linked low sulfur rubber of claim 11, wherein the cured cross-linked low sulfur rubber has a torsional shear difference that is at least 2.0 dNm greater than that of an analogous cross-linked sulfur rubber cured in the absence of the peroxide system with an amount of sulfur or sulfur compound effective to provide a sulfur content of more than 1% by weight.

13. A method for producing a cured low sulfur rubber, the method comprising the step of:
    curing the curable low sulfur liquid rubber composition of claim 1 by heating, the curable low sulfur liquid rubber composition being curable at a temperature of 100° C. to 140° C. and having a sulfur content of Q to 1% by weight.

14. A method for making cross-linked low sulfur rubber, the method comprising the steps of:
    polymerizing at least one monomer having a carbon chain of four to produce a polymer having a vinyl content of 1% to 90% and a number average molecular weight of 800 g/mol to 15,000 g/mol; and
    preparing a curable low sulfur liquid rubber composition based on the produced polymer and a peroxide system, the peroxide system comprising at least two organic peroxides having a 10-hour decomposition half-life temperature of from 60° C. to 100° C. selected from the group consisting of 1,1'-di(tert-butylperoxy)-3,3,5-trimethylcyclohexane, 1,1'-di(tert-butylperoxy)-cyclohexane, and dibenzoyl peroxide, wherein the curable low sulfur liquid rubber composition is curable at a temperature of 100° C. to 140° C. and has a sulfur content of 0 to 1% by weight.

* * * * *